July 4, 1967

P. J. CONNOLLY ETAL 3,328,858

SNAP HOOK FOR LOAD-CARRYING EQUIPMENT

Filed June 16, 1965

INVENTORS.
PATRICK J. CONNOLLY
JOHN S. BROWN
MICHAEL M. ARSLANIAN
ELDON C. METZGER

BY *Harry M. Saraspolsky*
*Edward J. Kelly, Herbert Berl*
*Charles G. Murphy* ATTORNEYS

United States Patent Office 3,328,858
Patented July 4, 1967

3,328,858
SNAP HOOK FOR LOAD-CARRYING
EQUIPMENT
Patrick J. Connolly, Medfield, John S. Brown, Framingham, Michael M. Arslanian, West Newton, and Eldon C. Metzger, Framingham, Mass., assignors to the United States of America as represented by the Secretary of the Army
Filed June 16, 1965, Ser. No. 464,590
3 Claims. (Cl. 24—241)

ABSTRACT OF THE DISCLOSURE

A snap hook comprising a body having a loop portion and a hook portion and a closure member hinged on the loop portion and comprising a narrow tongue with spaced upstanding sides for straddling the shank of the hook portion and closing the hook opening. The upstanding sides of the tongue gradually increase in height from the hinged end of the tongue to the free end thereof and include detents to engage the hook to retain the tongue in closed position.

---

The invention described herein, if patented, may be manufactured and used by or for the Government for govenmental purposes without the payment to us of any royalty thereon.

This invention relates to a snap hook for use with load-carrying equipment and more particularly for attaching various articles and pouches containing articles of equipment, ammunition, and the like to belts or body harnesses.

A soldier on maneuvers or in combat is required to carry on his person considerable quantities of equipment and supplies such as rations, water, ammunition, a medical kit, and the like. Many of these items are carried in fabric pouches and bags supported by means of webbing straps which are provided with snap hooks for attachment to a belt by means of eyelets or a D-ring attached to a belt or shoulder strap or other load-carrying equipment or portion thereof. In the alternative, the shoulder straps or other portions of the load-carrying equipment may be provided with snap hooks to which the fabric pouches or bags may be attached by means of D-rings or the like. The snap hooks which have been customarily used for this purpose have spring metal tongues which can be pressed inwardly with respect to the hook and which spring back to close the hook and prevent disconnection of the snap hook from the cooperating member. However, these springs quite often become caught in the webbing, particularly when such a snap hook is being attached to a web belt having eyelets in the webbing. As a result the springs become distorted and the snap hook is either no longer usable or it causes delays in attaching and detaching equipment and supplies. Such delays may be costly when the soldier is in a combat zone.

It is, therefore, an object of this invention to provide an improved snap hook which avoids the above-described difficulties encountered with snap hooks including springs.

A further object is to provide a springless snap hook which will normally be urged toward a closed condition by the effect of a load on the hook portion of the snap hook.

Various other objects and advantages will appear from the following description of one embodiment of the invention and in the appended claims.

The invention may be more clearly understood by reference to the drawings in which like numerals are used to designate like parts in all views and in which.

Figure 1:
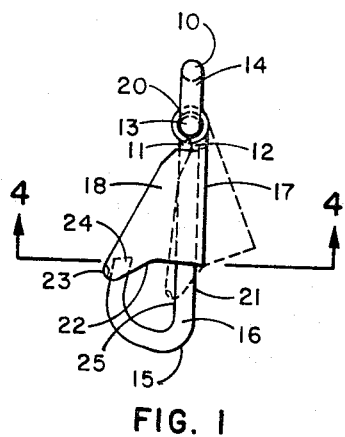
FIGURE 1 is a side view of the snap hook with the tongue in hook closing position and (in broken lines) in hook open position.

In the illustrated embodiment of the invention, the snap hook 10 comprises a body member 11 and a closure member 12 hingedly mounted on the body member 11 for swinging movement with respect thereto in a manner to be described.

The body member 11 comprises a base member 13, which forms one side of a loop portion 14, and a hook portion 15 having an elongated shank 16 extending from the base member. The base member 13 and loop portion 14 lie in a first plane (the plane of the paper in FIGURE 2), while the hook portion 15 lies in a second plane (the plane of the paper in FIGURE 1) substantially perpendicular to the first plane. The entire body member 11 may be preferably formed of one continuous length of material, such as steel or brass wire.

Figure 2:
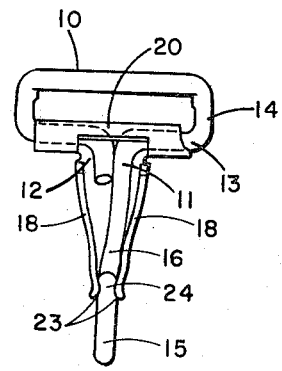
FIGURE 2 is a front view of the snap hook with the closure in hook closing position.
Figure 4:
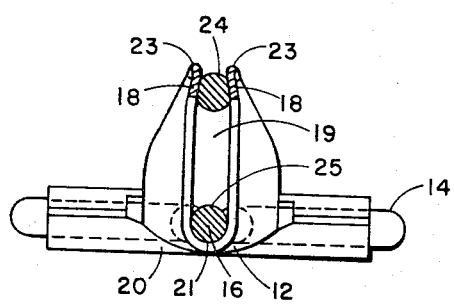
FIGURE 4 is a cross-section taken along the line 4—4 of FIGURE 1.
Figure 3:
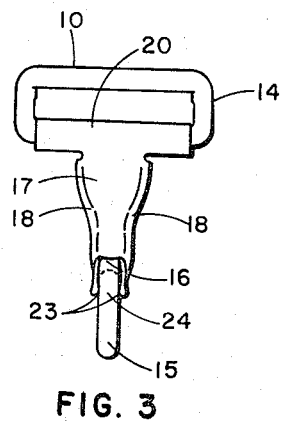
FIGURE 3 is a rear view of the snap hook with the closure in hook closing position.

The closure member 12 comprises a tongue 17 having upstanding sides 18 to define a channel 19, best shown in cross-section in FIGURE 4, and a bifurcated lateral extension 20, which is formed to hingedly engage base member 13 of body member 11, straddling elongated shank 16 as shown in FIGURES 2 and 3 of the drawing. The length of tongue 17 is shorter than the length of the hook portion 15 such that the hook portion 15 extends substantially beyond the end of tongue 17 as best seen in FIGURE 1 of the drawing. In this arrangement, the tongue is swingable toward and from the side 21 of elongated shank 16 lying opposite the opening 22 defined by the hook portion 15. The upstanding sides 18 of tongue 17 gradually increase in height from the hinged end of the tongue to the free end thereof at which point the height of the sides is conformed to close the opening 22 defined by the hook portion 15 when the tongue 17 is in position adjacent the said side 21 of elongated shank 16 and to provide continuous smooth edges when the closure member is swung to its open position as shown in phantom in FIGURE 1 to assure easy entry to the hook portion. The free edges of the upstanding sides 18 are provided with detent means 23 to releasably engage the free end 24 of the hook portion 15 when the tongue 17 is in this position as best seen in FIGURES 2 and 4. It will be seen that detent means 23 also serve as stop means when the closure member 12 is moved to its open position. Like the body member 11, the closure member 12 may also be formed of a single piece of material, such as steel or brass sheet.

In the operation of the snap hook as best shown in FIGURE 1, starting from the closed position, the closure member 12 is manually disengaged by forcing the detent means 23 past the free end 24 of the hook portion 15 causing the tongue 17 to swing away from the elongated shank 16 and the upstanding sides 18 to swing clear of the hook opening 22. This may be readily accomplished with one hand by supporting the portion of hook portion 15 which extends beyond the end of the tongue 17 with the forefinger while depressing the edges of the upstanding sides 18 with the thumb. When the opening 22 is substantially clear, the detent means 23 make contact with the inside 25 of elongated shank 16 to limit the swinging movement of the closure member 12. In closing the snap hook, the procedure will simply be reversed with the tongue 17 being swung toward the side 21 of elongated sank 16, causing the upstanding sides 18 to close the hook opening 22 and the detent means 23 to engage the free end 24 of the hook portion 15 to releasably retain the closure member 12 in closed position.

In certain primary uses of the snap hook with load-carrying equipment the loop portion 14 will be up and the hook portion 15 will be down, while the tongue 17 will be adjacent to the body of the person wearing the load-carrying equipment. Thus, the weight of any load on the hook portion will align both the shank 16 and tongue 17 against the body, causing the snap hook to close and remain closed except when the closure member 12 is intentionally moved to its open position.

It can be seen, therefore, that even if the detent means 23 should accidentally become disengaged from the hook portion 15, the weight of the load on the hook portion 15 will normally tend to prevent sufficient opening of the snap hook to occur to permit the load to become disengaged. It is to be understood, however, that use of the snap hook is not limited to having the loop portion 14 up and the hook portion 15 down, since under most circumstances the locking of the snap hook in a closed condition by snapping the detent means 23 over the free end 24 of hook portion 15 is adequate to maintain the snap hook closed until the upstanding sides 18 of the tongue 17 are forcibly pressed with the thumb or fingers to cause the detent means 23 to snap over the hook portion 15. Furthermore, the relative difficulty or ease of unlocking the snap hook is readily adapted by squeezing or spreading the upstanding sides 18 in the vicinity of the detent means 23.

While the invention has been described in terms of a tongue having solid upstanding sides forming a channel within which the shank of the hook portion operates, it is to be understood that one or more openings in the upstanding sides may be provided to reduce the weight of the snap hook; in other words, a portion of each of the upstanding sides may be removed by an suitable means so long as sufficient rigidity and strength remain in the upstanding sides to avoid bending in use. Likewise, more or less of the metal may be removed from the bifurcated lateral extension by means of which the tongue and upstanding sides are hingedly attached to one side of the loop portion of the snap hook.

It is also to be understood that other means for securing the snap hook in a closed condition than the detent means described above may be employed without departing from the spirit and scope of the present invention.

Furthermore, it will be readily understood that the snap hook of the present invention may utilize a varity of means other than a loop portion for attachment of the snap hook to straps or other devices used for supporting the snap hook. The bifurcated lateral extension 20 on the tongue 17 may be hingedly mounted on a crossbar or tube perpendicular to the base of the elongated shank 16 or to any equivalent of base member 13 of loop portion 14. The ends of such a crossbar or tube may be fixed or rotatably attached to load-carrying equipment or a wide variety of other types of equipment by any suitable means, as will occur to those skilled in the snap hook art.

The snap hook of this invention eliminates the need for any type of spring-operated closure for a hook to be used in attaching and supporting pieces of equipment, bags, pouches, and the like to various types of weight-supporting devices wherein the hook portion is inserted in an opening and then the hook is closed to prevent accidental disengagement of the hook. When used with load-carrying equipment employed by Armed Forces personnel, hunters, campers, mountain climbers and others; and, when suitably oriented with respect to the body of the user, the action of the weight of the load effectively maintains the tongue of the snap hook adjacent to the shank of the hook portion so as to close the hook and/or minimize the chances of accidental opening thereof. Thus the snap hook of this invention is very effective, relatively inexpensive to make, and virtually free of such mechanical problems as are characteristic of spring-containing snap hooks.

It will be understood that various changes in the details, materials, and arrangements of parts, which have been herein described and illustrated in order to explain the nature of the invention, may be made by those skilled in the art within the principle and scope of the invention as expressed in the appended claims.

We claim:

1. A snap hook for load-carrying equipment comprising a body having a base portion and a hook portion having an elongated shank extending from said base portion, a tongue mounted on said base portion for swinging movement toward and from the side of said shank lying opposite the opening formed by said hook portion, the length of said tongue being substantially less than the length of said hook portion, said tongue having spaced upstanding sides extending substantially the entire length thereof to define a narrow channel capable of receiving said shank therein, the height of said sides increasing gradually from the end of said tongue adjacent said base portion of a maximum at the free end of said tongue, the height of said sides at said free end of said tongue being capable of closing the opening formed by said hook portion when said tongue is adjacent to said shank, and means for releasably retaining said tongue and upstanding sides in hook closing position.

2. A snap hook according to claim 1 wherein said means comprise detent means carried by the upstanding sides of said tongue and capable of releasably engaging the free end of said hook portion.

3. A snap hook for load carrying equipment comprising a body having a loop portion lying in a first plane and a hook portion having an elongated shank extending from one side of said loop portion, said hook portion lying in a second plane substantially perpendicular to said first plane, a narrow tongue hingedly mounted on said one side of said loop portion for swinging movement in said second plane toward and from the side of said longated shank lying opposite the opening formed by said hook portion, the length of said tongue being substantially less than the length of said hook portion, said tongue having spaced upstanding sides extending substantially the entire length thereof to define a narrow channel capable of receiving said elongated shank of said hook portion therein, said upstanding sides being conformed to close the opening formed by said hook portion when said tongue is adjacent to said elongated shank and to provide continuous smooth outer edges from a point near the hinged end of said tongue to the outer end of said sides when said tongue is swung away from said shank to open said hook portion, and detent means formed in said upstanding sides for releasably engaging the free end of said hook portion to retain said sides in hook closing position, said detent means also being capable of engaging said elongated shank when said tongue is swung away from said shank to a position wherein the said continuous smooth outer edges of said upstanding sides are substantially aligned with said elongated shank.

References Cited

UNITED STATES PATENTS

| 148,665 | 3/1874 | Burns | 24—236 |
| 316,269 | 4/1885 | Jewett | 24—240 |
| 1,105,945 | 8/1914 | Williamson | 24—241 X |
| 2,334,677 | 11/1943 | Konikoff | 24—236 |

WILLIAM FELDMAN, *Pirmary Examiner.*

DONALD A. GRIFFIN, *Examiner.*